(12) United States Patent
Kim (10) Patent No.: US 11,912,088 B2
(45) Date of Patent: Feb. 27, 2024

(54) APPARATUS AND METHOD FOR CONTROLLING HEIGHT OF VEHICLE

(71) Applicants: Hyundai Motor Company, Seoul (KR); Kia Corporation, Seoul (KR)

(72) Inventor: Byung Joo Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 140 days.

(21) Appl. No.: 17/748,919

(22) Filed: May 19, 2022

(65) Prior Publication Data

US 2023/0093748 A1 Mar. 23, 2023

(30) Foreign Application Priority Data

Sep. 17, 2021 (KR) .......................... 10-2021-0125190

(51) Int. Cl.
*B60G 17/016* (2006.01)
*B60G 17/0195* (2006.01)
*B60G 17/017* (2006.01)

(52) U.S. Cl.
CPC ....... *B60G 17/016* (2013.01); *B60G 17/0195* (2013.01); *B60G 2400/96* (2013.01)

(58) Field of Classification Search
CPC .............. B60G 17/016; B60G 17/0195; B60G 2500/30; B60G 2400/62; B60G 2400/96
See application file for complete search history.

(56) References Cited

U.S. PATENT DOCUMENTS

| 2008/0302014 A1* | 12/2008 | Szczerba | ............... | E05F 15/689 49/31 |
| 2014/0095023 A1* | 4/2014 | Myggen | .............. | G06F 3/04842 701/37 |
| 2021/0237620 A1* | 8/2021 | Mizoi | .................... | B60N 2/829 |

\* cited by examiner

*Primary Examiner* — Phutthiwat Wongwian
*Assistant Examiner* — Arnold Castro
(74) *Attorney, Agent, or Firm* — Slater Matsil, LLP (57) ABSTRACT

In an embodiment an apparatus for controlling a height of a vehicle includes a seat having a seat unit and a backrest unit, the seat unit movable in directions of two or more axes, a control module configured to determine a position of the seat in a state in which a driver is seated, estimate a body shape of the driver based on the position of the seat, calculate a vehicle height adjustment parameter based on the body shape and generate a suspension control signal for adjusting a vehicle height based on the vehicle height adjustment parameter and a suspension driving device configured to control a suspension based on the suspension control signal.

20 Claims, 7 Drawing Sheets

Fig.7

APPARATUS AND METHOD FOR CONTROLLING HEIGHT OF VEHICLE

CROSS-REFERENCE TO RELATED APPLICATIONS

This application claims the benefit of Korean Patent Application No. 10-2021-0125190, filed in the Korean Intellectual Property Office on Sep. 17, 2021, which application is hereby incorporated herein by reference.

TECHNICAL FIELD

The present disclosure relates to an apparatus and a method for controlling a height of a vehicle.

BACKGROUND

The height of a vehicle can be adjusted using a suspension. A driver also adjusts the height of a vehicle according to his preferred driving style. In addition, the height of a vehicle may be adjusted according to a road surface condition.

Because the height of a vehicle has an important effect on the driver's riding or alighting comfort when riding or alighting the vehicle, there is a need to provide a scheme of controlling a vehicle height for the driver's riding or alighting convenience.

SUMMARY

Embodiments of the present disclosure solve the abovementioned problems occurring in the prior art while advantages achieved by the prior art are maintained intact.

Embodiments of the present disclosure provide an apparatus and a method for controlling a vehicle that can improve the riding or alighting convenience of a driver.

Other embodiments of the present disclosure provide an apparatus and a method for controlling a vehicle that can increase the convenience of getting on or off the vehicle customized for each driver.

The technical problems to be solved by embodiments are not limited to the aforementioned problems, and any other technical problems not mentioned herein will be clearly understood from the following description by those skilled in the art to which the present disclosure pertains.

According to embodiments of the present disclosure, an apparatus for controlling a height of a vehicle includes a seat including a seat unit and a backrest unit and movable in directions of two axes or more, and a control module that determines a position of the seat in a state in which a driver is seated, estimates a body shape of the driver based on the position of the seat, calculates a vehicle height adjustment parameter based on the body shape, and generates a suspension control signal for adjusting a vehicle height in proportion to the vehicle height adjustment parameter.

According to an embodiment of the present disclosure, the control module may estimate a calf length of the driver and a hip height from a ground in the state in which the driver is seated, and calculate the vehicle height adjustment parameter based on a deviation between the calf length and the hip height estimated.

According to an embodiment of the present disclosure, the control module may estimate a distance between a reference point at an outer end of the seat in a front direction and a center of an accelerator as the calf length.

According to an embodiment of the present disclosure, the control module may calculate an amount of change in the position of the seat in a seated state from a preset initial position of the seat, and determine a position of the reference point at the outer end of the seat in the seated state based on a sum of the amount of change in the position and coordinates of the preset initial position of the outer end.

According to an embodiment of the present disclosure, the control module may sum first to third heights to estimate a position of a hip reference point which a tailbone of a hip faces in the seated state as the hip height, the first height may refer to a height of the reference point of an inner end of the seat from the ground, the second height may refer to a change in the height of the inner end reference point, and the third height may refer to a height between a changed position of the inner end reference point and the hip reference point.

According to an embodiment of the present disclosure, the control module may calculate the third height based on a reference hypotenuse connecting the changed position of the inner end reference point and the hip reference point and a trigonometric function for an angle between the reference hypotenuse and a lower plane of the seat.

According to an embodiment of the present disclosure, the control module may calculate a hip position change value based on a preset backrest length and a trigonometric function for a tilting angle of the backrest unit, and calculate the reference hypotenuse length by subtracting the hip position change value from a line segment connecting the inner end and a preset tilting reference point.

According to an embodiment of the present disclosure, the control module may add a margin parameter proportional to a thigh length of the driver to the vehicle height adjustment parameter.

According to an embodiment of the present disclosure, the control module may estimate the thigh length lengthwise in proportion to a tilting angle of the backrest unit.

According to an embodiment of the present disclosure, the control module may set the margin parameter to be larger when getting off than when getting on.

According to other embodiments of the present disclosure, a method of controlling a height of a vehicle includes determining a position of a seat including a seat unit and a backrest unit in a state in which a driver is seated, estimating a body shape of the driver based on the position of the seat, calculating a vehicle height adjustment parameter based on the body shape, and adjusting a vehicle height in proportion to the vehicle height adjustment parameter.

According to an embodiment of the present disclosure, the method may include estimating a calf length of the driver, estimating a hip height from a ground in the state in which the driver is seated, and calculating the vehicle height adjustment parameter based on a deviation between the calf length and the hip height.

According to an embodiment of the present disclosure, a distance between a reference point at an outer end of the seat in a front direction and a center of an accelerator may be estimated as the calf length.

According to an embodiment of the present disclosure, the estimating of the calf length may include calculating an amount of change in the position of the seat in a seated state from a preset initial position of the seat, and determining a position of the reference point at the outer end of the seat in the seated state based on a sum of the amount of change in the position and coordinates of the preset initial position of the outer end.

According to an embodiment of the present disclosure, the estimating of the hip height may include calculating a height of a reference point of an inner end of the seat from the ground at an initial position as a first height, calculating a change amount in the height of the inner end reference point in the seated state as a second height, calculating a height between a changed position of the inner end reference point and a hip reference point as a third height, and summing the first to third heights to estimate the hip height from the ground in the state in which the driver is seated.

According to an embodiment of the present disclosure, the calculating of the third height may include calculating a length of a reference hypotenuse connecting the changed position of the inner end reference point and the hip reference point, identifying an angle between the reference hypotenuse and a lower plane of the seat, and calculating the third height based on a product of the reference hypotenuse and a sine value of the angle.

According to an embodiment of the present disclosure, the calculating of the length of the reference hypotenuse may include calculating a hip position change value based on a preset backrest length and a trigonometric function for a tilting angle of the backrest unit, and calculating the reference hypotenuse length by subtracting the hip position change value from a line segment connecting the changed position of the inner end reference point and a preset tilting reference point.

According to an embodiment of the present disclosure, the calculating of the vehicle height may include estimating a thigh length of the driver, and calculating a margin parameter in proportion to the thigh length of the driver.

According to an embodiment of the present disclosure, the estimating of the thigh length may include estimating a thigh length lengthwise in proportion to the tilting angle of the backrest unit.

According to an embodiment of the present disclosure, the calculating of the margin parameter may include setting the margin parameter to be larger when getting off than when getting on.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to FIGS. 1 to 7, embodiments of the present disclosure will be described in detail.

Figure 1:
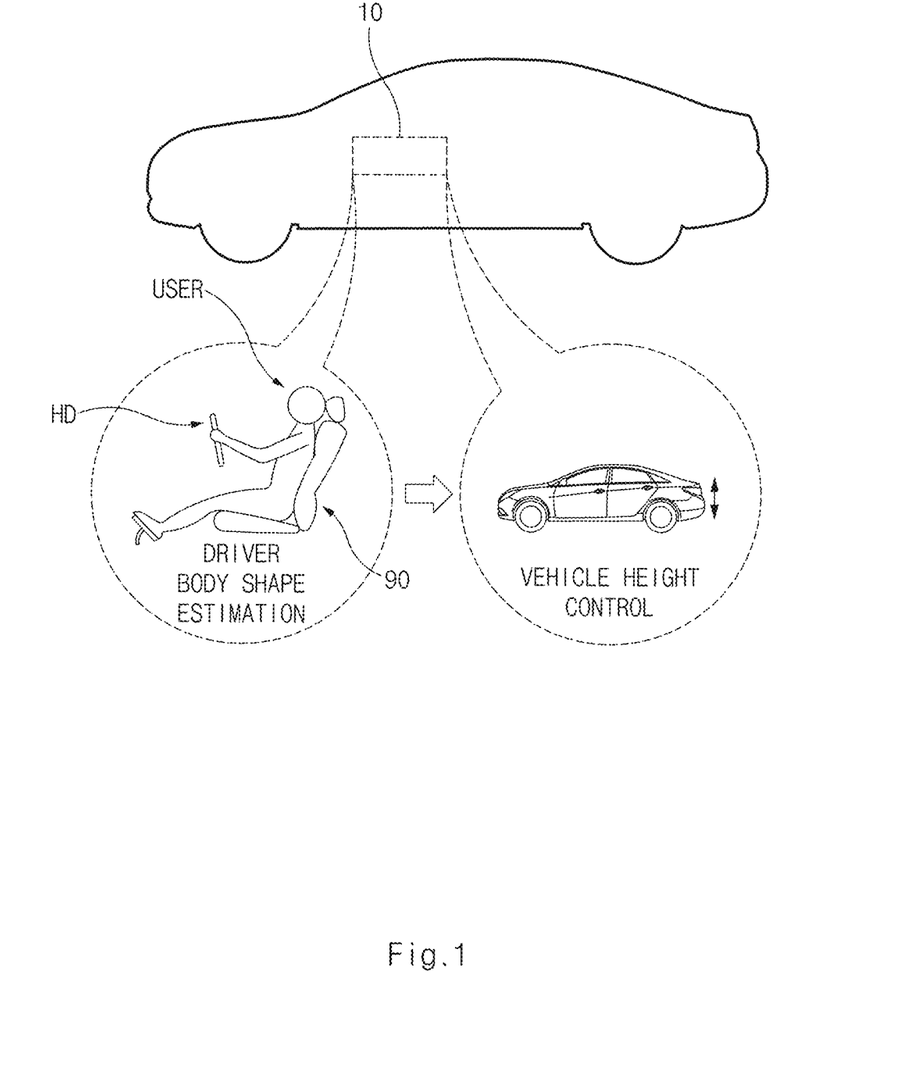
FIG. 1 is a view illustrating vehicle height control according to an embodiment of the present disclosure.
Figure 2:
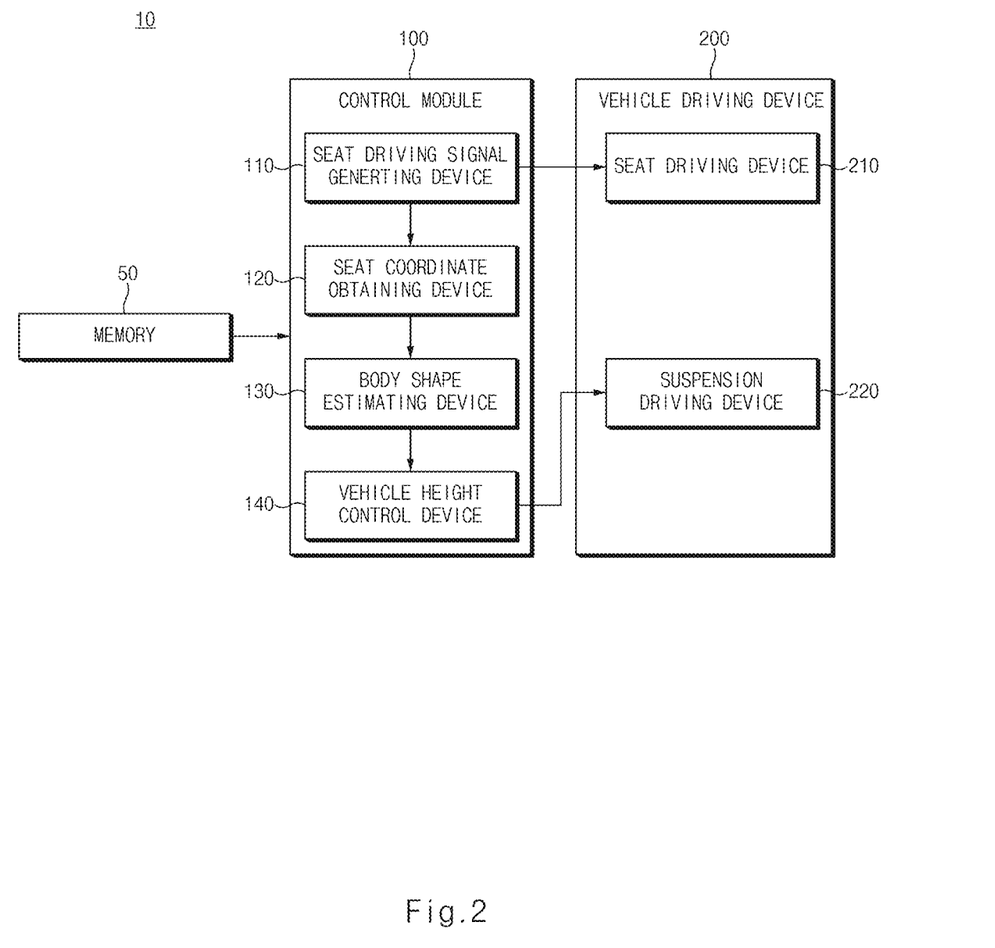
FIG. 2 is a block diagram illustrating the configuration of an apparatus for controlling a height of a vehicle according to an embodiment of the present disclosure.

FIG. 1 is a view illustrating vehicle height control according to an embodiment of the present disclosure. FIG. 2 is a block diagram illustrating the configuration of an apparatus for controlling a height of a vehicle according to an embodiment of the present disclosure. An apparatus for controlling a height of a vehicle according to an embodiment of the present disclosure may be implemented inside a vehicle.

Referring to FIGS. 1 and 2, an apparatus 10 for controlling a height of a vehicle according to an embodiment of the present disclosure may determine the position of a seat 90 in a state in which a driver is seated in the vehicle, and estimate a body shape of the driver based on the position of the seat 90. The position of the seat 90 may include the movement of the seat in the three-axis direction or a tilting angle of a backrest unit. In addition, the apparatus 10 for controlling a height of a vehicle may adjust the vehicle height based on the body shape of the driver.

To this end, the apparatus 10 for controlling a height of a vehicle according to an embodiment of the present disclosure includes a memory 50, a control module 100, and a vehicle driving device 200.

The memory 50 may store driver information and position information of a seat according to the driver information therein. In addition, the memory 50 may store information on the amount of change in the seat position according to a seat driving signal.

The control module 100 may include a seat driving signal generating device 110, a seat coordinate obtaining device 120, a body shape estimating device 130, and a vehicle height control device 140.

The seat driving signal generating device 110 may generate a seat driving signal based on a user's selection or information stored in the memory.

The seat coordinate obtaining device 120 may determine the position of the seat while the vehicle is driving. This is because the seat position may be adjusted for rest while the vehicle is parked and stopped, and the seat position for rest has nothing to do with the body shape of the driver. The seat coordinate obtaining device 120 may obtain position coordinates of reference points preset according to movement of the seat.

The body shape estimating device 130 may estimate the body shape of the driver based on the position of the seat 90. For example, it may be estimated that the driver's calf is shorter as the seat position moves forward, or that the driver's calf is longer as the seat position moves rearward. In addition, as the tilting angle of a seat backrest unit increases, it may be estimated that the driver's arm length is longer, and the thigh length may be estimated to be longer in proportion to the arm length. Alternatively, as the tilting angle of the seat backrest unit decreases, it may be estimated that the driver's arm length is shorter, and the thigh length may be estimated to be shorter in proportion to the arm length.

A scheme of estimating a body shape will be described in detail later.

The vehicle height control device 140 may control the vehicle height based on the estimated driver body shape. To this end, the vehicle height control device 140 may calculate a vehicle height adjustment parameter based on the body shape and generate a suspension control signal based on the vehicle height adjustment parameter. The vehicle height control device 140 may generate a suspension control signal to increase the height of the vehicle in proportion to the vehicle height adjustment parameter. The vehicle height may be a height from the ground to a specified point on a vehicle body, and for example, may refer to a height from the ground to a vehicle underside.

The vehicle height control device 140 may control a hip height of the driver seated on the seat 90 to be equal to the calf length of the driver. To this end, the vehicle height control parameter may be generated by subtracting the hip height of the driver in the state where the driver is sitting on the seat 90 from the calf length of the driver.

The vehicle height control device 140 may generate the suspension control signal for controlling the suspension based on the vehicle height control parameter. The vehicle height control parameter may be negative (−) or positive (+) depending on the calf length of the driver and the hip height of the driver in a seated state. The suspension control signal may control the suspension to increase the vehicle height in proportion to the vehicle height control parameter. Accordingly, when the vehicle height control parameter is positive, the vehicle height may be higher than an initially set state, and when the vehicle height control parameter is negative, the vehicle height may be lower than the initially set state.

When the vehicle height control parameter is positive, it may mean that the calf length is longer than the hip height of the driver in the seated state. Accordingly, when the vehicle height control parameter is positive, the vehicle height may be controlled to be high so that the hip height of the driver may be equal to the calf length in the seated state.

When the vehicle height control parameter is negative, it may mean that the hip height of the driver is longer than the calf length in the seated state. Accordingly, when the vehicle height control parameter is a negative number, the vehicle height may be controlled to be low so that the driver's hip height is equal to the calf length in the seated state.

The vehicle driving device 200 may include a seat driving device 210 and a suspension driving device 220.

The seat driving device 210 may drive the seat based on the seat driving signal generated by the seat driving signal generating device 110. The seat driving device 210 may move a seat unit 91 of the seat 90 shown in FIG. 4 in three axial directions, and may adjust the tilting angle θb of a backrest unit 92 of the seat 90.

The suspension driving device 220 may adjust the vehicle height by driving the suspension based on the suspension control signal generated by the vehicle height control device 140.

Figure 3:
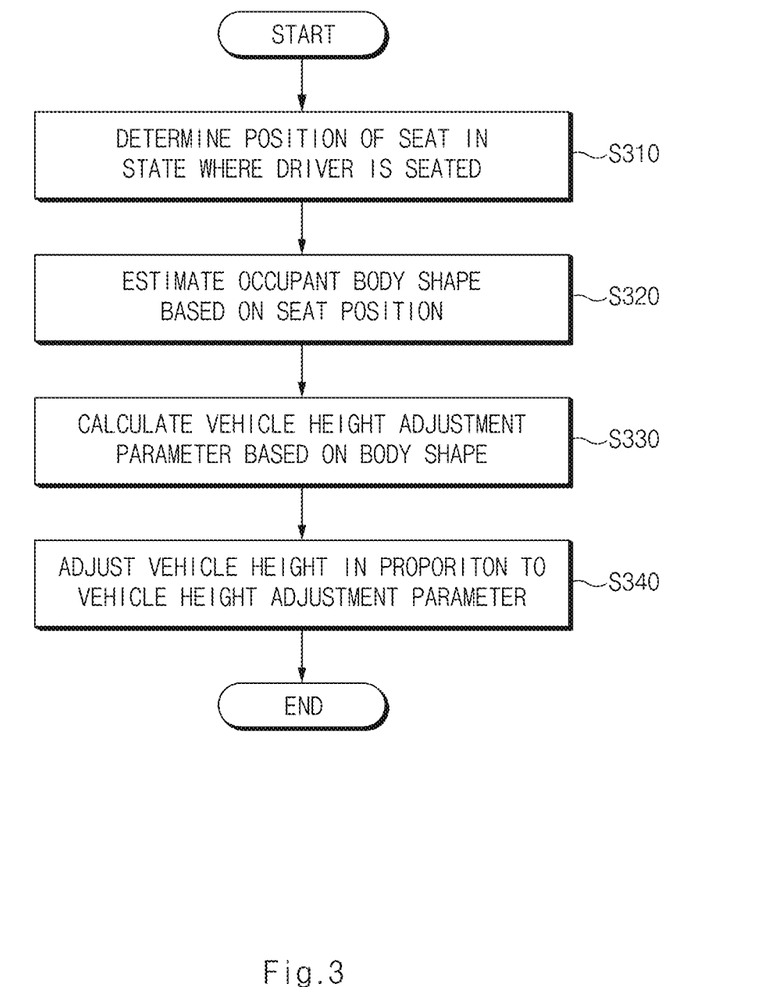
FIG. 3 is a flowchart illustrating a vehicle height control method according to an embodiment of the present disclosure.

FIG. 3 is a flowchart illustrating a vehicle height control method according to an embodiment of the present disclosure.

Referring to FIG. 3, in a method of controlling a height of a vehicle according to an embodiment of the present disclosure, in a first operation S310, the control module 100 may determine the position of the seat while the driver is seated. The state in which the driver is seated may mean a state in which the driver is driving.

In a second operation S320, the control module boo may estimate the body shape of an occupant based on the seat position.

The occupant's body shape may mean a lower body shape of the occupant. The control module 100 may estimate the calf length of the driver and the hip height from the ground in a state in which the driver is seated.

In addition, the control module 100 may estimate the thigh length of the driver in order to estimate the height of the driver.

In a third operation S330, the control module 100 may calculate the vehicle height adjustment parameter based on the body shape.

The control module 100 may calculate the vehicle height adjustment parameter based on a deviation between the calf length and the hip height of the driver in a seated state.

In addition, the control module 100 may add a margin parameter to the vehicle height adjustment parameter. The margin parameter may adjust the vehicle height adjustment parameter to increase the vehicle height when getting off and lower the vehicle height when getting on the vehicle. In addition, the margin parameter may adjust the vehicle height adjustment parameter to increase the vehicle height as the height of the driver increases.

In a fourth operation S340, the control module boo may adjust the vehicle height in proportion to the vehicle height adjustment parameter.

The control module 100 may generate the suspension control signal capable of increasing the vehicle height in proportion to the vehicle height adjustment parameter. The control module 100 may provide the generated suspension control signal to the suspension driving device 220.

Figure 4:
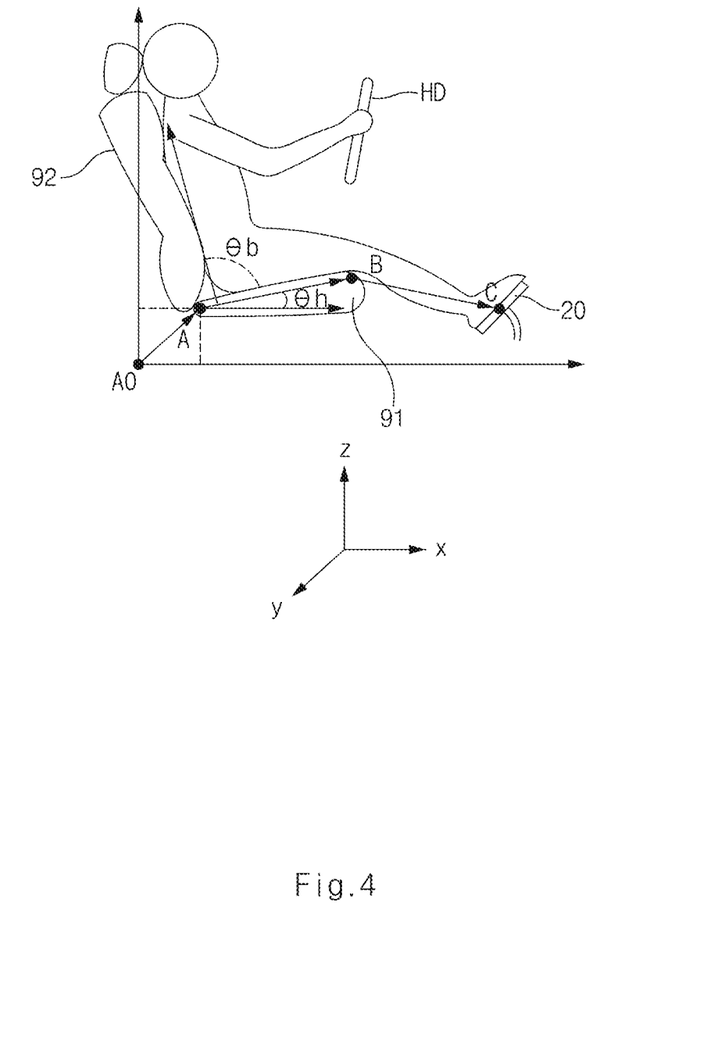
FIGS. 4 and 5 are diagrams illustrating an example of estimating a body shape of an occupant based on a seat position.
Figure 5:
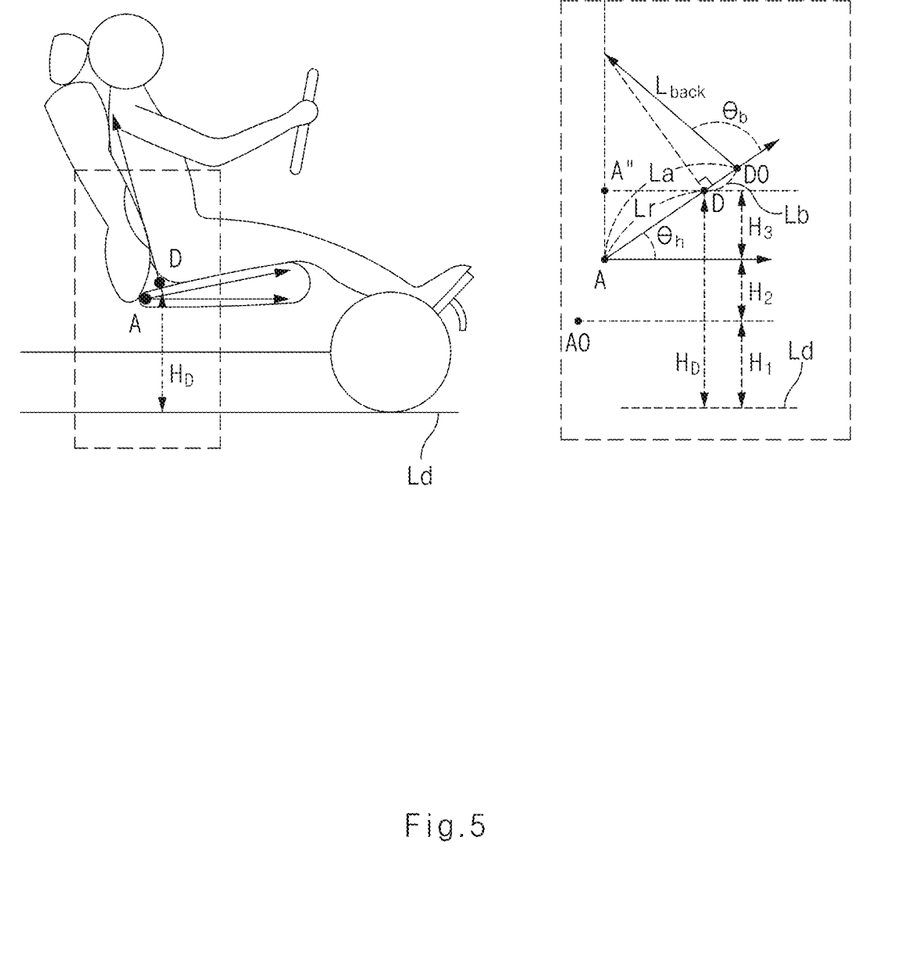

FIGS. 4 and 5 are diagrams illustrating an example of estimating a body shape of an occupant based on a seat position. A detailed method of estimating the body shape of an occupant will be described with reference to FIGS. 4 and 5. Reference numerals "A", "B" and "C" denoted in the drawings refer to point "A", point "B" and point "C", respectively.

Point "A", point "B" and point "C may be preset reference points. The point "A" may be an inner end reference point located in a rear direction from the seat, and the point "B" may correspond to an outer end reference point in a front direction from the seat. As for the front direction and the rear direction, the driver's gaze direction in a seated state may be a reference. The distance between the points "A" and "B" may be predetermined by design. The point "C" may correspond to a center position on a plane on the pedal. The pedal may be a brake pedal or an accelerator pedal. The plane of the pedal may refer to the outer surface that the driver's feet face.

The points "A", "B" and "C" may be expressed as coordinates in a three-dimensional (3D) Cartesian coordinate system. The origin A0 of the 3D Cartesian coordinate system may correspond to the location of the point "A" in the initial position of the seat. In other words, the points "A", "B" and "C" may be reference points on the seat at the position changed from the initial position of the seat. The initial position of the seat may be a state in which the height of the seat is the lowest and the most rearward position.

The coordinates of the point "A" may be obtained based on the amount of movement of the seat. To this end, the amount of coordinate change of the point "A" according to the amount of movement of the seat may be designed in advance and stored in the memory. And, when the reference point of the inner end of the seat becomes the point "A" according to the movement of the seat, the coordinates of the point "A" may be obtained based on the amount of coordinate change from the point A0. For example, when the coordinates of A0 are (0,0,0) and the amount of coordinate change according to the amount of movement of the seat is ($\Delta x$, $\Delta y$, $\Delta z$), the coordinates of the point "A" (Xa, Ya, Za) may be ($\Delta x$, $\Delta y$, $\Delta z$).

The coordinates of the point "B" may be obtained based on a coordinate difference between the points "A" and "B". When the difference between the points "A" and "B" is fixed, the coordinate difference between the points "A" and "B" may be preset. When the coordinate difference between the points "A" and "B" is (x1, y1, z1), the coordinates (Xb, Yb, Zb) of the point "B" may be ($\Delta x+x1$, $\Delta y+y1$, $\Delta z+z1$).

The coordinates (Xc, Yc, Zc) of the point "C" may be preset to a fixed value.

The control module 100 may estimate the calf length (Lcalf) and the hip height Hd of the driver in the seated state in order to generate the vehicle height adjustment parameter.

The calf length Lcalf of the driver may be considered as the distance between the points "B" and "C". That is, the calf length Lcalf of the driver may be calculated as $\sqrt{(Xb-Xc)^2+(Yb-Yc)^2+(Zb-Zc)^2}$.

The hip height Hd may refer to the hip height in the state in which the driver is seated, and may mean the height between a hip reference point "D" from the ground. The hip reference point "D" may be a point on the outside of the seat where the driver's hip tailbone faces in the seated state.

As shown in FIG. 5, the hip height may be obtained by summing a first height H1, a second height H2 and a third height H3.

The first height H1 may correspond to the height of the reference point of the inner end of the seat 90 from the ground in the initial position state. In the initial position state, the height of the reference point of the inner end of the seat 90 from the ground may correspond to the sum of H11 and H12. H11 corresponds to the height of the lower part of the vehicle body from the ground, and may be a preset initial height.

Because H12 corresponds to the shortest distance between the position coordinates (0, 0, 0) of point A0 from the height of the lower part of the vehicle body, it is possible to check H12 from the preset design value. That is, the first height H1 may be a preset height.

The second height H2 may mean a change in the height of the inner end reference point in the seated state. Because the second height H2 corresponds to the amount of change in height of the point "A", which is the reference point of the inner end, the second height H2 may be calculated as a Z-axis deviation between the points A0 and "A".

The third height H3 may mean a height between the changed position of the inner end reference point and the hip reference point. That is, the third height H3 may refer to a Z-axis deviation that is the height between the hip reference point D and the point "A".

The third height H3 may be calculated as the product of a reference hypotenuse Lr connecting the point "A" and the point "D" and the sin $\theta h$. The $\theta h$ may mean an internal angle between the reference hypotenuse Lr and a straight line parallel to the lower plane of the seat 90. The length of the reference hypotenuse Lr may be calculated by subtracting the hip position change value from the length of the line segment connecting the point "A" and a tilting reference point D0. A hip position change value Lb means a position change of the driver's hip according to the tilting of the backrest unit 92, and may mean a distance from the point D0 to the point "D" shown in FIG. 5. The tilting reference point Do may be a preset point and may be set in consideration of the driver standard body shape. The distance between the point "D" and the point D0 may be calculated as $L\_back \times \cos(\pi-\theta back)$. The L_back may be the length of the backrest, and may be a preset design value for calculating the hip position change.

As a result, the third height H3 may be calculated through following Equation 1.

$$Lr = La - Lb = La - L\_back \times \cos(\pi - \theta back) \quad \text{[Equation 1]}$$

In an embodiment of the present disclosure, the vehicle height adjustment parameter may include a margin parameter (Hmargin).

That is, the vehicle height adjustment parameter (Hcmd) may be calculated as Lcalf-Hd+Hmargin.

The margin parameter (Hmargin) may be designed in consideration of the driver's thigh length and the weight difference when getting on and off. The vehicle height adjustment parameter (Hcmd) may increase in proportion to the margin parameter (Hmargin), so that the vehicle height increases.

In addition to the length of the calf, increasing the height of the vehicle as the driver's height increases may help the driver's convenience. Because the driver's height has a significant correlation with the thigh length in addition to the calf length, the larger the driver's thigh length, the larger the margin parameter (Hmargin) may be set. A thigh length Lt of the driver may be calculated by subtracting the length of the reference hypotenuse Lr from the length between the points "A" and "B".

In addition, when getting off, the load on the vehicle body may be greater than when getting on, and the greater the load on the vehicle body, the lower the vehicle height. When the vehicle height is low, the margin parameter (Hmargin) may be set to increase the vehicle height. Therefore, when getting off, the margin parameter may be set larger than when getting on.

Alternatively, the vehicle height adjustment parameter (Hcmd) may not add up the margin parameter (Hmargin) when getting on, but may add up the margin parameter (Hmargin) when getting off.

Figure 6:
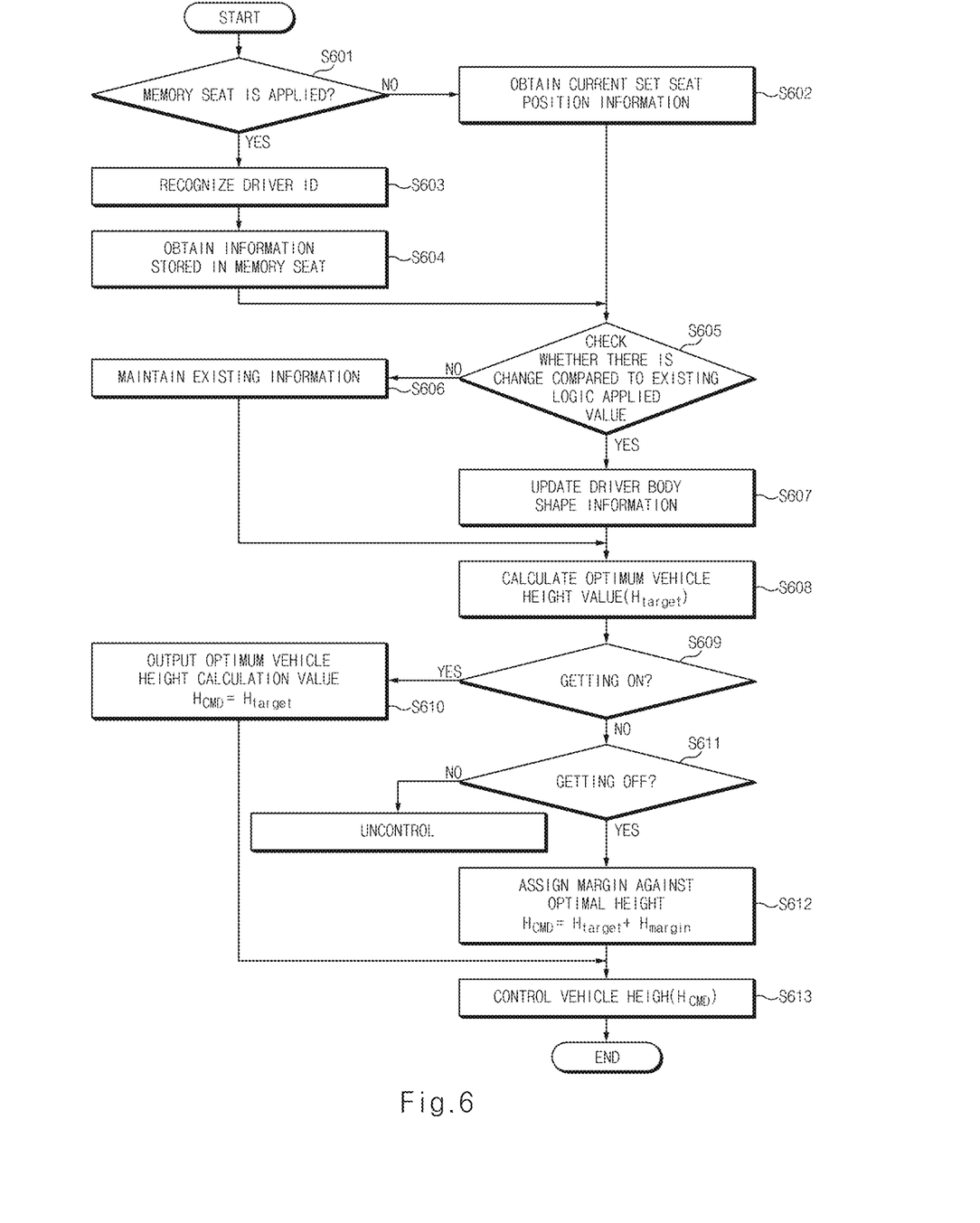
FIG. 6 is a flowchart illustrating a method of controlling a height of a vehicle according to another embodiment of the present disclosure.

FIG. 6 is a flowchart illustrating a method of controlling a height of a vehicle according to another embodiment of the present disclosure.

Referring to FIG. 6, for a method of controlling a height of a vehicle according to another embodiment of the present disclosure, first, the control module 100 may determine whether a memory seat is applied to the vehicle in S601.

When the memory seat is applied, in S603 and S604, the control module boo may identify driver information and obtain seat position information stored in the memory seat.

When the memory seat is not applied, in S602, the control module 100 may identify the seat movement by the driver's manipulation and obtain seat position information according to the seat movement.

After obtaining the seat position information, in S605, the control module 100 may determine whether there are any changes compared to an existing logic applied value. The existing logic applied value may be an operation of determining whether there is driver body shape information estimated based on the obtained memory seat position.

When there is no change, in S608, the control module 100 may calculate the optimum vehicle height value (Htarget) by maintaining the existing information. The optimum vehicle height value (Htarget) may be a vehicle height at which the driver's hip height corresponds to the driver's calf length when seated.

When the position information is changed, in S607 and S608, the driver body shape information may be updated by updating the changed information, and the optimum vehicle height value (Htarget) may be calculated based on the updated driver body shape information.

After calculating the optimum vehicle height value, in S609, the control module 100 may determine whether the vehicle is in a riding situation. The control module 100 may determine that the vehicle is in the riding situation when the door is opened in a state in which the engine is turned off.

In the case of a riding situation, in S610 and S612, the control module 100 may generate the vehicle height adjustment parameter (Hcmd) based on the optimum vehicle height calculation value, and control the vehicle height based on the vehicle height adjustment parameter. That is, the margin parameter may not be applied in the riding situation.

In the case of getting off, in S611, S612 and S613, the vehicle height adjustment parameter (Hcmd) may be generated by adding the margin parameter (Hmargin), and the vehicle height may be controlled based on the vehicle height adjustment parameter.

Figure 7:
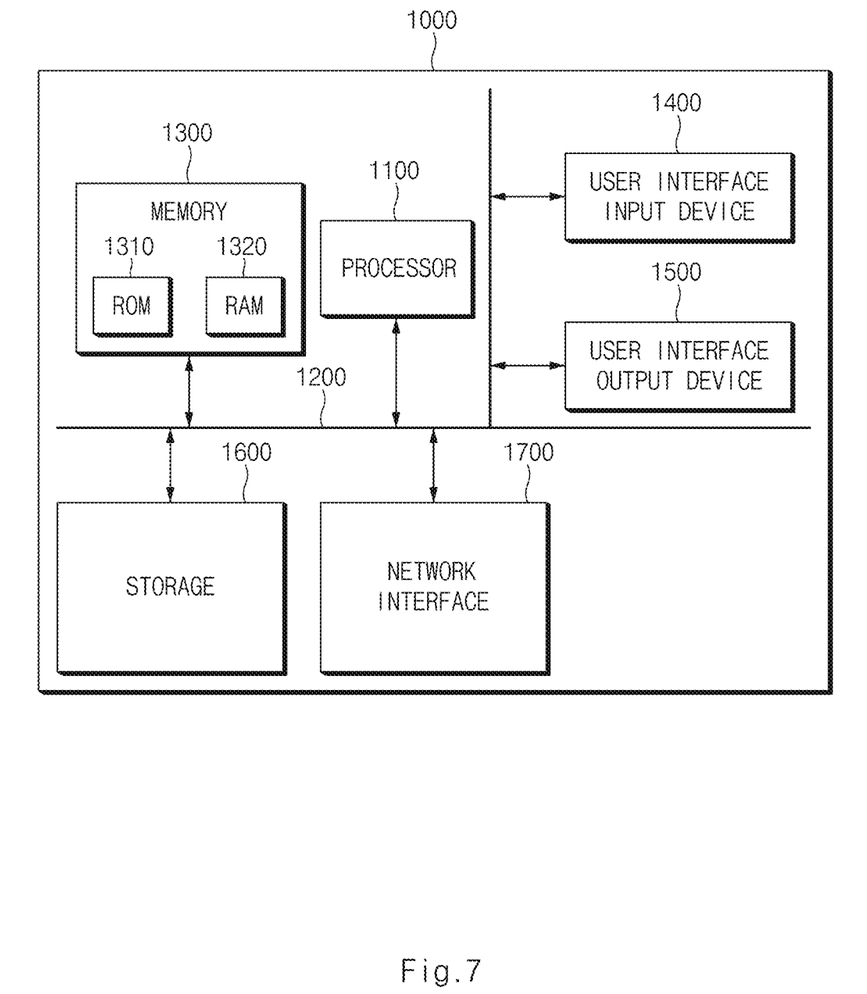
FIG. 7 is a block diagram illustrating a computing system according to an embodiment of the present disclosure.

FIG. 7 is a block diagram illustrating a computing system according to an embodiment of the present disclosure Referring to FIG. 7, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600, and may include the control module 100 according to an embodiment of the present disclosure. The memory 1300 and the storage 1600 may include various types of volatile or non-volatile storage media. For example, the memory 1300 may include a ROM (Read Only Memory) and a RAM (Random Access Memory).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiment of the present disclosure, by adjusting the height of the vehicle according to the driver's body shape, it is possible to increase the convenience of getting on or off the vehicle in a customized manner.

In addition, various effects that are directly or indirectly understood through the present disclosure may be provided Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a height of a vehicle, the apparatus comprising:
    a seat including a seat unit and a backrest unit, the seat unit movable in directions of two or more axes;
    a control module configured to:
        determine a position of the seat in a state in which a driver is seated;
        estimate a body shape of the driver based on the position of the seat;
        calculate a vehicle height adjustment parameter based on the body shape; and
        generate a suspension control signal for adjusting a vehicle height based on the vehicle height adjustment parameter; and
    a suspension driving device configured to control a suspension based on the suspension control signal.

2. The apparatus of claim 1, wherein the control module is configured to:
    estimate a calf length of the driver and a hip height from a ground in the state in which the driver is seated; and
    calculate the vehicle height adjustment parameter based on a deviation between the estimated calf length and the estimated hip height.

3. The apparatus of claim 2, wherein the control module is configured to estimate a distance between a reference point at an outer end of the seat in a front direction and a center of an accelerator as the calf length.

4. The apparatus of claim 3, wherein the control module is configured to:
    calculate an amount of change in the position of the seat in a seated state from a preset initial position of the seat; and
    determine a position of the reference point at the outer end of the seat in the seated state based on a sum of the amount of change in the position and coordinates of the preset initial position of the outer end.

5. The apparatus of claim 4,
wherein the control module is configured to sum first to third heights to estimate a position of a hip reference point being faced by a tailbone of a hip faces in the seated state as the hip height,
wherein the first height refers to a height of a reference point of an inner end of the seat from the ground at the initial position,
wherein the second height refers to a change in the height of the inner end reference point in the seated state, and
wherein the third height refers to a height between a changed position of the inner end reference point and the hip reference point.

6. The apparatus of claim 5, wherein the control module is configured to calculate the third height based on a reference hypotenuse connecting the changed position of the inner end reference point and the hip reference point and a trigonometric function for an angle between the reference hypotenuse and a lower plane of the seat.

7. The apparatus of claim 6, wherein the control module is configured to:
calculate a hip position change value based on a preset backrest length and a trigonometric function for a tilting angle of the backrest unit; and
calculate a reference hypotenuse length by subtracting the hip position change value from a line segment connecting the changed position of the inner end reference point and a preset tilting reference point.

8. The apparatus of claim 2, wherein the vehicle height adjustment parameter comprises a margin parameter proportional to a thigh length of the driver.

9. The apparatus of claim 8, wherein the control module is configured to estimate the thigh length lengthwise based on a tilting angle of the backrest unit.

10. The apparatus of claim 8, wherein the control module is configured to set the margin parameter to be larger when getting off than when getting on.

11. A method for controlling a height of a vehicle, the method comprising:
determining a position of a seat including a seat unit and a backrest unit in a state in which a driver is seated;
estimating a body shape of the driver based on the position of the seat;
calculating a vehicle height adjustment parameter based on the body shape; and
adjusting a vehicle height based on the vehicle height adjustment parameter.

12. The method of claim 11, wherein calculating the vehicle height adjustment parameter comprises:
estimating a calf length of the driver;
estimating a hip height from a ground in the state in which the driver is seated; and
calculating the vehicle height adjustment parameter based on a deviation between the calf length and the hip height.

13. The method of claim 12, wherein estimating the calf length comprises estimating a distance between a reference point at an outer end of the seat in a front direction and a center of an accelerator as the calf length.

14. The method of claim 13, wherein estimating the calf length comprises:
calculating an amount of change in the position of the seat in a seated state from a preset initial position of the seat; and
determining a position of the reference point at the outer end of the seat in the seated state based on a sum of the amount of change in the position and coordinates of the preset initial position of the outer end.

15. The method of claim 14, wherein estimating the hip height comprises:
calculating a height of a reference point of an inner end of the seat from the ground at an initial position as a first height;
calculating a change amount in the height of the inner end reference point in the seated state as a second height;
calculating a height between a changed position of the inner end reference point and a hip reference point as a third height; and
summing the first to third heights to estimate the hip height from the ground in the state in which the driver is seated.

16. The method of claim 15, wherein calculating the third height comprises:
calculating a length of a reference hypotenuse connecting the changed position of the inner end reference point and the hip reference point;
identifying an angle between the reference hypotenuse and a lower plane of the seat; and
calculating the third height based on a product of the reference hypotenuse and a sine value of the angle.

17. The method of claim 16, wherein calculating the length of the reference hypotenuse comprises:
calculating a hip position change value based on a preset backrest length and a trigonometric function for a tilting angle of the backrest unit; and
calculating the reference hypotenuse length by subtracting the hip position change value from a line segment connecting the changed position of the inner end reference point and a preset tilting reference point.

18. The method of claim 12, wherein calculating the vehicle height adjustment parameter comprises:
estimating a thigh length of the driver;
calculating a margin parameter in proportion to the thigh length of the driver; and
adding the margin parameter to the vehicle height adjustment parameter.

19. The method of claim 18, wherein estimating the thigh length comprises estimating the thigh length lengthwise based on a tilting angle of the backrest unit.

20. The method of claim 18, wherein calculating the margin parameter comprises setting the margin parameter to be larger when getting off than when getting on.

* * * * *